(12) United States Patent
Gallion

(10) Patent No.: US 10,316,991 B2
(45) Date of Patent: Jun. 11, 2019

(54) WIDE RANGE EDGE MOUNTING CLAMP

(71) Applicant: HellermannTyton Corporation, Milwaukee, WI (US)

(72) Inventor: Justin Gallion, Wilwaukee, WI (US)

(73) Assignee: HELLERMANNTYTON CORPORATION, Milwaukee, WI (US)

(*) Notice: Subject to any disclaimer, the term of this patent is extended or adjusted under 35 U.S.C. 154(b) by 0 days.

(21) Appl. No.: 15/672,937

(22) Filed: Aug. 9, 2017

(65) Prior Publication Data

US 2018/0045337 A1 Feb. 15, 2018

Related U.S. Application Data

(60) Provisional application No. 62/373,109, filed on Aug. 10, 2016.

(51) Int. Cl.
| | |
|---|---|
| F16B 2/12 | (2006.01) |
| F16L 3/233 | (2006.01) |
| F16L 3/127 | (2006.01) |
| F16L 3/13 | (2006.01) |
| F16B 21/18 | (2006.01) |
| F16L 3/24 | (2006.01) |

(52) U.S. Cl.
CPC .............. *F16L 3/2334* (2013.01); *F16B 2/12* (2013.01); *F16L 3/127* (2013.01); *F16L 3/13* (2013.01); *F16B 21/186* (2013.01); *F16L 3/24* (2013.01)

(58) Field of Classification Search
CPC . F16L 3/2334; F16L 3/127; F16L 3/13; F16B 21/186
See application file for complete search history.

(56) References Cited

U.S. PATENT DOCUMENTS

| | | | | |
|---|---|---|---|---|
| 4,118,838 A * | 10/1978 | Schiefer | .................... | F16L 3/10 24/115 R |
| 4,557,024 A * | 12/1985 | Roberts | ................. | F16L 33/035 24/16 R |
| 5,324,013 A * | 6/1994 | Marino | .................... | B25B 1/08 269/137 |
| 6,463,631 B2 * | 10/2002 | Noda | .................... | F16L 3/1025 24/16 R |
| 6,516,498 B2 * | 2/2003 | LaCoy | ................. | F16L 3/1025 24/16 R |

(Continued)

*Primary Examiner* — Anita M King
(74) *Attorney, Agent, or Firm* — Robert J. Myers

(57) ABSTRACT

A mounting clamp assembly configured to support one or more elongate elements from a cantilevered support. The mounting clamp assembly includes a clamp body having a stationary jaw defining a first clamping surface. The clamp body defines a plurality of clamp body teeth and a ratcheting member slideably attached to the clamp body. The ratcheting member has a moveable jaw that defines a second clamping surface opposite the first clamping surface. The ratcheting member further defines a plurality of ratcheting member teeth that are configured to engage the clamp body teeth. The plurality of ratcheting member teeth have a saw tooth profile, thereby providing a clamping force that slideably moves the stationary jaw and the moveable jaw toward one another that is less than an unclamping force that moves the stationary jaw and the moveable jaw away from one another.

18 Claims, 6 Drawing Sheets

(56) References Cited

U.S. PATENT DOCUMENTS 7,658,353 B2 * 2/2010 Ford .................... E06B 9/02
                                                248/201
2005/0284995 A1 * 12/2005 Hutter, III ............... B64C 1/406
                                                248/235

* cited by examiner

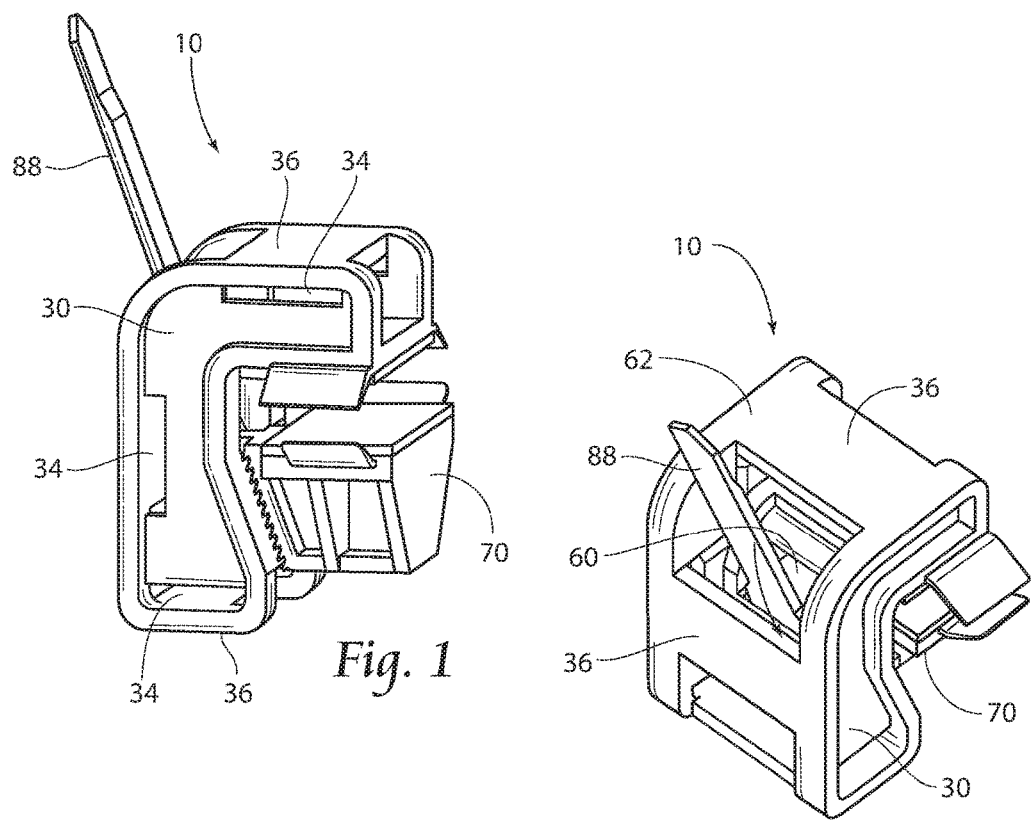
Fig. 1
Fig. 2
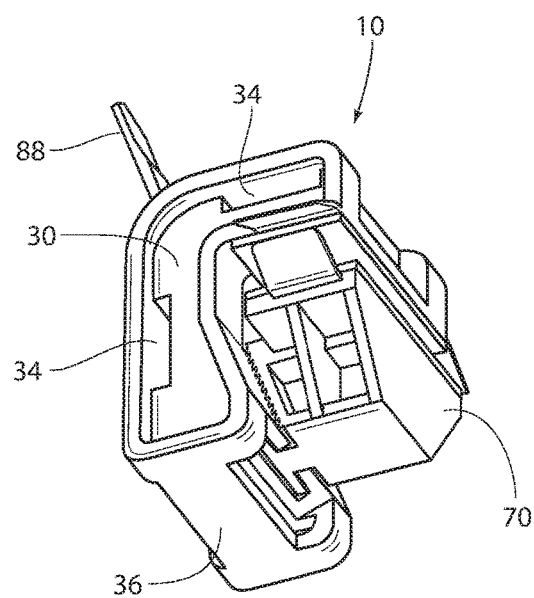
Fig. 3

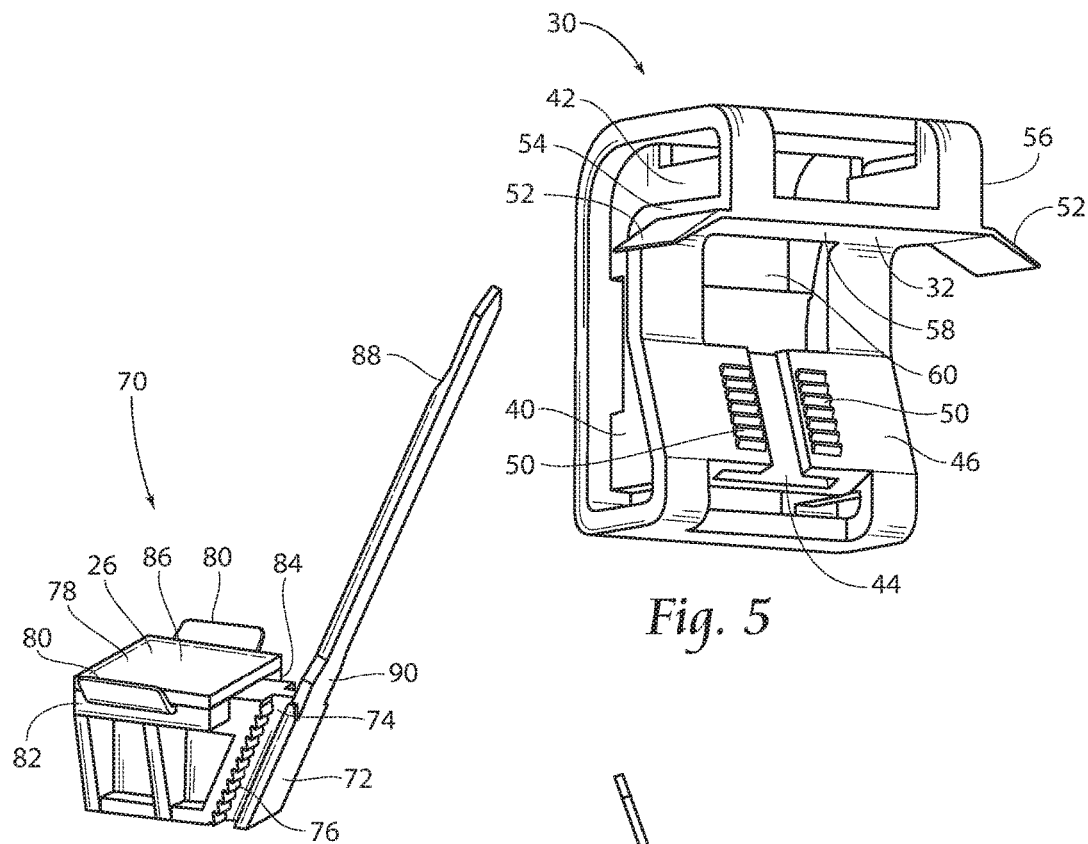
Fig. 5
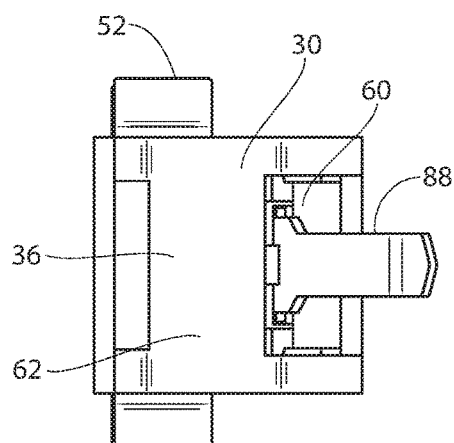
Fig. 4
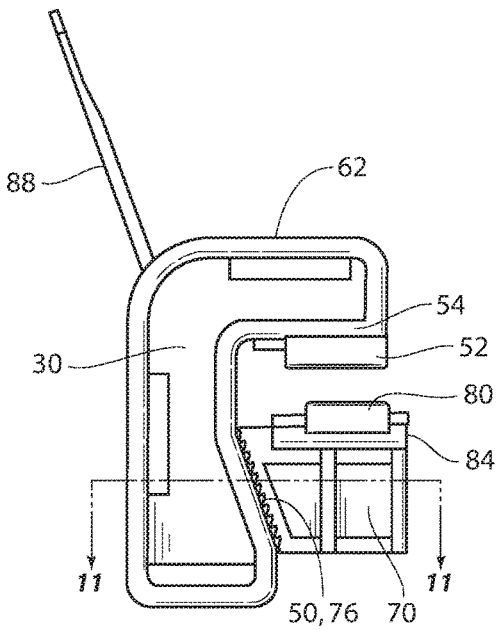
Fig. 6
Fig. 7

ID MOUNTING CLAMP

WIDE RANGE EDGE MOUNTING CLAMP

CROSS-REFERENCE TO RELATED APPLICATION

This application claims the benefit under 35 U.S.C. § 119(e) of U.S. Provisional Patent Application No. 62/373,109, filed on Aug. 10, 2016, the entire disclosure of which is hereby incorporated by reference.

TECHNICAL FIELD OF INVENTION

This invention relates generally to specialized mounts for use with cable ties and/or "T" connectors. More particularly, the invention relates to a mount that can be secured to a plate, rib or other substantially flat protruding support structure.

BACKGROUND OF THE INVENTION

It is often necessary to support one or more hoses, wires, conduits, cables or tube bundle from a cantilevered support structure such as a plate or rib. Prior art supportive mounts may include, but are not limited to, mounting devices with two-sided tape, fir tree mounts, arrowhead mounts and basic clips. In the case of the two-sided tape mounting device, the surface for the mounting device to be adhered to must be clean and free from oil and dirt prior to applying the tape. Even if clean, the tape can lose its adhesive strength over time and the supportive mounting device may detach from the supporting surface. In order to use a fir tree mounting device, arrowhead mounting device, or other similar mounting device, one or more openings must be formed in the supporting surface. This adds additional cost to the fabrication of the supporting surface. In addition, the location of each such supportive mounting device must be determined at the time of fabrication as it is often difficult or impracticable to form the required openings in the supporting surface just prior to the installation of the mounting device. While basic mounting clips can usually be installed at any location along the supporting surface, these types of mounting devices are typically limited in the loads they can support due to the construction and elasticity of the clip material. For example, a plastic mounting clip is inexpensive to manufacture, but cannot support a significant load as its clamping force is not substantial. In an environment subject to vibration, a plastic mounting clip is prone to failure as it is likely to vibrate out of position or fail due to insufficient clamping strength. The strength of a mounting clip may be augmented with a metal clip; however, this complicates the construction and adds cost to the mount molding process and still may result in a mounting clip having insufficient strength to support the required load.

Thus, there is a need for a mounting device that can be installed at almost any desired location without the need for mounting holes, is made from a single material, is easy to install and provides sufficient clamping force about the supportive structure to support an attached elongate element or elements, such as a hose(s), wire(s), cable(s), conduit(s) or tube bundle(s), without failure due to load requirements, location, vibration, or the passage of time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment of the invention, a mounting clamp assembly configured to support one or more elongate elements such as hose(s), wire(s), cable(s), conduit(s) or tube bundle(s) from a cantilevered support such as a flat plate, rib, angle iron, sheet metal channel or similar support structure is provided. The mounting clamp assembly includes a clamp body having a stationary jaw defining a first clamping surface. The clamp body defines a plurality of clamp body teeth and a ratcheting member slideably attached to the clamp body. The ratcheting member has a moveable jaw that defines a second clamping surface opposite the first clamping surface. The ratcheting member further defines a plurality of ratcheting member teeth that are configured to engage the clamp body teeth. The plurality of ratcheting member teeth have a saw tooth profile, thereby providing a clamping force that slideably moves the stationary jaw and the moveable jaw toward one another that is less than an unclamping force that moves the stationary jaw and the moveable jaw away from one another.

The first clamping surface may be substantially parallel to the second clamping surface. The plurality of clamp body teeth and the plurality of ratcheting member teeth may be arranged along a plane that is substantially non-parallel with the first clamping surface and the second clamping surface.

The clamp body may define an elongated T-shaped slot. In this particular embodiment the ratcheting member defines an elongated T-shaped protrusion and the T-shaped protrusion is slideably received within the T-shaped slot.

A first portion of the plurality of clamp body teeth may be arranged on first side of a narrow portion of the T-shaped slot and a second portion of the plurality of clamp body teeth may be arranged on a second side of the narrow portion of the T-shaped slot. In this particular embodiment, a first portion of the plurality of ratcheting member teeth are arranged on first side of a narrow portion of the T-shaped protrusion and a second portion of the plurality of ratcheting member teeth are arranged on a second side of the narrow portion of the T-shaped protrusion.

The T-shaped protrusion may define an elongate tension tab extending through an aperture in the clamp body such that a portion of the tension tab extends past an outer surface of the clamp body. The tension tab is configured to be grasped by a cable-tie installation tool.

An adhesive material may be applied to the first clamping surface and/or the second clamping surface.

The clamp body may define a first channel and a second channel extending therethrough. The first channel may be coplanar with the second channel. A major axis of the first channel may be perpendicular to a major axis of the second channel. The major axes of the first and second channels may be substantially parallel to the first clamping surface. The clamp body may define a third channel extending therethrough. A major axis of the third channel may be perpendicular to the major axes of the first and second channels. The major axis of the third channel may be substantially perpendicular to the first clamping surface. The clamp body may define a fourth channel extending therethrough. The fourth channel may be non-coplanar with the first and second channels. A major axis of the fourth channel may be parallel to the major axis of the second channel. The major axis of the fourth channel may be substantially parallel to the first clamping surface.

The clamp body may define a U-slot in an outer surface of the clamp body that is configured to receive a circular T-shaped connector.

The ratcheting member may define a J-shaped hook.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 1 is a side perspective view of the wide range edge clamp in accordance with an embodiment of the invention;

FIG. 2 is a top perspective view in accordance with an embodiment of the invention;

FIG. 3 is a bottom perspective view in accordance with an embodiment of the invention;

FIG. 4 is a side perspective view of the ratcheting member with tension tab in accordance with an embodiment of the invention;

FIG. 5 is a front perspective view of the clamp body in accordance with an embodiment of the invention;

FIG. 6 is a top plan view of the wide range edge clamp in accordance with an embodiment of the invention;

FIG. 7 is a side elevation view in accordance with an embodiment of the invention;

DETAILED DESCRIPTION OF THE INVENTION

Although the disclosure hereof is detailed and exact to enable those skilled in the art to practice the invention, the physical embodiments herein disclosed are merely non-limiting examples of embodiments of the invention which may be embodied in other specific structures. While the preferred embodiment has been described, the details may be changed without departing from the invention.

Figure 13:
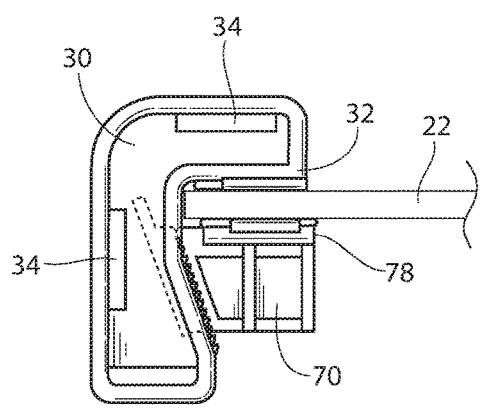
FIG. 13 is a side elevation view of the wide range edge clamp installed on a thicker plate in accordance with an embodiment of the invention.
Figure 14:
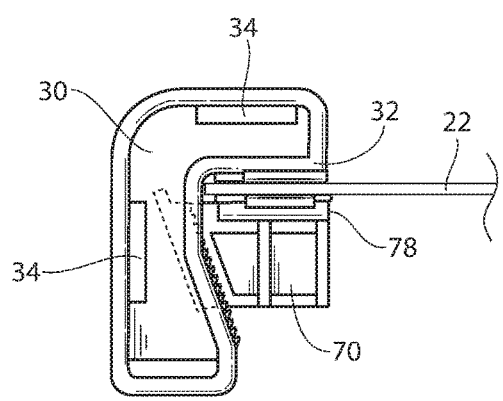
FIG. 14 is a side elevation view of the wide range edge clamp installed on a thinner plate in accordance with an embodiment of the invention.

A non-limiting example of a wide range edge clamp, hereinafter referred to as the edge clamp 10, is shown in FIGS. 1 through 3. The edge clamp 10 may be used to support one or more elongate elements such as hose(s), wire(s), cable(s), conduit(s), or tube bundle(s) from a cantilevered flat plate, rib, angle iron or similar support structure 22. The edge clamp 10 includes a clamp body 30 and a slideably mating interlocking ratcheting member 70. As shown in FIGS. 13 and 14, the stationary jaw 32 of the clamp body 30 and the ratcheting jaw 78 of the ratcheting member 70 lock to grasp opposite sides of the support structure 22 to which the edge clamp 10 is attached by the force exerted by the stationary jaw 32 and the ratcheting jaw 78 toward the other. Strengthening ribs are provided about both the clamp body 30 and ratcheting member 70 to increase the assembly's overall strength and minimize the material required to mold each part. However, it is to be understood that both the clamp body 30 and ratcheting member 70 could be molded without the use of the strengthening ribs while not departing from the invention.

As best shown in FIG. 5, the clamp body 30 is substantially "J" shaped having a leg portion 40 and jaw portion 42. The clamp body 30 includes an elongated T-shaped slot 44, hereinafter referred to as the T-slot 44 along the interior 46 of the leg portion 40. Serrated clamp body teeth 50 are formed on each side of the T-slot 44. The stationary jaw 32, having a clamping surface 58, is formed along the interior 46 of the jaw portion 42. In a preferred embodiment, the clamping surface 58 of the jaw is rectangular and substantially flat. It is to be understood that the clamping surface 58 could be any shape and have a contour.

Now referring to FIG. 4, the ratcheting member 70 includes an elongated T-shaped protrusion 72, hereinafter referred to as the T-rail 72 along its inner side 74 that is received within the T-slot 44 in the clamp body 30. Serrated ratcheting member teeth 76 are formed on the ratcheting member 70 on each inner side 74 of the T-rail 72. Like clamp body 30, ratcheting member 70 also has a ratcheting jaw 78 having a jaw surface 86 that is rectangular and substantially flat as shown. The jaw surface 86 is substantially parallel to the clamping surface 58. As used herein, substantially parallel means±5° of absolutely parallel, Again, the shape and contour of the jaw surface 86 can vary without departing from the invention.

Figure 10:
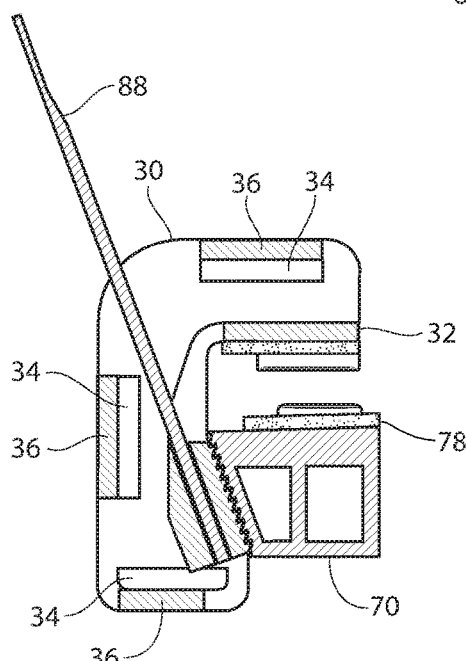
FIG. 10 is a sectional view taken along line 10-10 of FIG. 8 in accordance with an embodiment of the invention.
Figure 11:
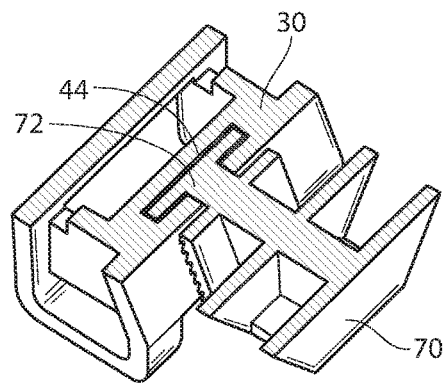
FIG. 11 is a sectional view taken along line 11-11 of FIG. 7 in accordance with an embodiment of the invention.

As shown in FIGS. 7 and 10, after the ratcheting member 70 is mated with the clamp body 30 by inserting the T-rail 72 into the T-slot 44 (see also FIG. 11), the clamp body teeth 50 and ratcheting member teeth 76 engage with one another. The saw tooth profile of the clamp body teeth 50 and ratcheting member teeth 76 permit the stationary jaw 32 of the clamp body 30 and the ratcheting jaw 78 of the ratcheting member 70 to easily move toward one another thereby closing the jaws 32, 78, but not in the opposite direction (e.g. away from one another), thereby opening the jaws 32, 78, i.e. a clamping force applied to close the jaws 32, 78 is less than an unclamping force applied to open the jaws 32, 78. This one-way interlocking relationship between the clamp body teeth 50 and the ratcheting member teeth 76 provides the ability of the edge clamp 10 to lock into place on the support structure 22 when the clamp body 30 is biased toward the ratcheting member 70.

Figure 8:
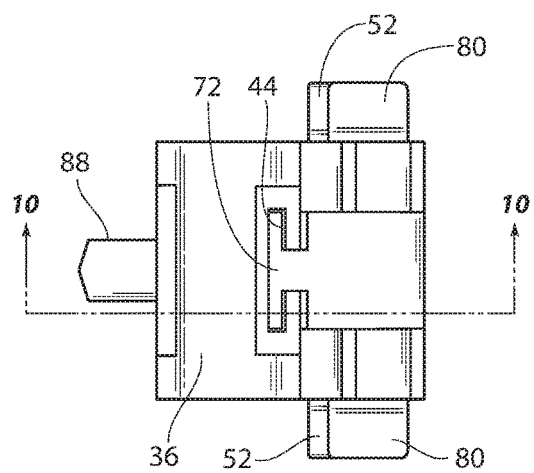
FIG. 8 is a bottom plan view in accordance with an embodiment of the invention.
Figure 9:
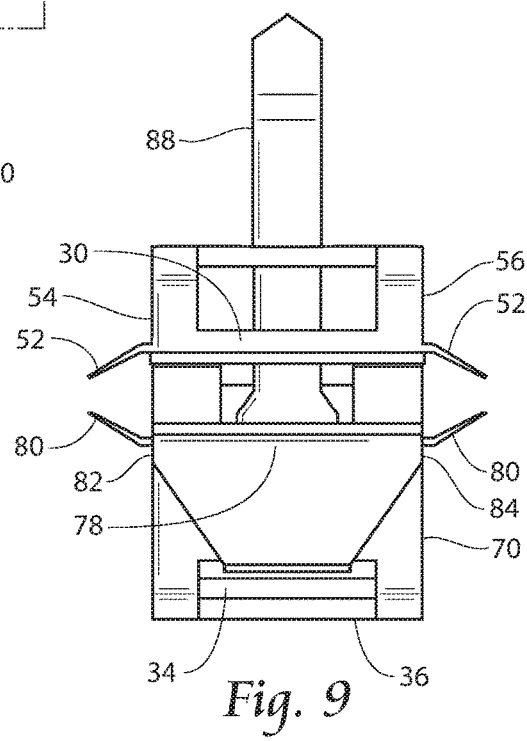
FIG. 9 is a front elevation view in accordance with an embodiment of the invention.
Figure 12:
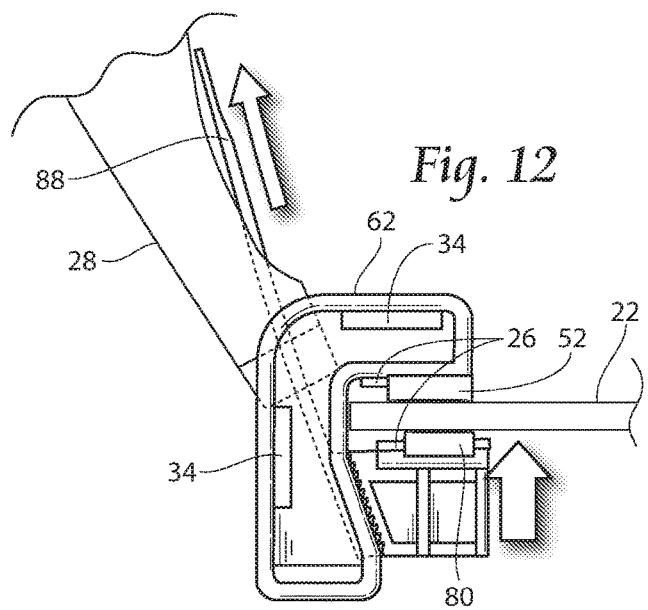
FIG. 12 is a side elevation view showing a cable-tie tensioning tool installing the wide range edge clamp in accordance with an embodiment of the invention.

As best shown in FIG. 9, retention wings 52 are formed on the sides 54, 56 of the stationary jaw 32. Similar wings 80 are formed on the sides 82, 84 of the ratcheting jaw 78. As best illustrated in FIG. 12, the retention wings 52, 80 can be used to temporarily hold the edge clamp 10 onto the support structure 22. As the clamp body 30 is biased toward the ratcheting member 70, the retention wings 52, 80 make initial contact with the support structure 22. Once this contact is made, the edge clamp 10 can be moved along the support structure 22 as needed, but will remain attached to the structure without the need of additional support. Once the final location and/or position of the edge clamp 10 is determined, an additional biasing force (by tool or by hand as discussed below) is applied to the edge clamp 10 thus bringing the stationary jaw 32 and the ratcheting jaw 78 into contact with the support structure 22 as shown in FIGS. 13 and 14. In the preferred embodiment, the thickness of the support structure 22 can range from 1 mm to 18 mm.

Referring back to FIG. 4 as well as FIG. 10, a severable or separable elongated tension tab 88 may be formed on an end 90 of the T-rail 72 on the ratcheting member 70. As best shown in FIG. 2, the tension tab 88 extends through an aperture 60 in the clamp body 30 such that a sufficient portion of the tension tab 88 extends past the clamp body's outer surface 62. As shown in FIG. 12, the tension tab 88 may be grasped with a cable-tie installation tool 28 and imparted with a predetermined amount of pulling force so that the clamping force exerted between the stationary jaw 32 of the clamp body 30 and the ratcheting jaw 78 of the ratcheting member 70 is a known amount. The excess portion of the tension tab 88 extending beyond the clamp body's outer surface 62 may be removable once the edge clamp 10 has been installed and the required amount of clamping force has been established (see again FIGS. 13 and 14). Removal can occur with a snap-off mechanism or by being cut-off by the cable-tie installation tool 28.

The nearly straight travel of the ratcheting member 70 along the interior surface 46 of the stem or leg portion 40 of the clamp body 30 and up into the clamp body 30 allows for the option of an adhesive 26 to be applied on both the stationary jaw 32 and the ratcheting jaw 78. The application of an adhesive 26 has been shown to dramatically improve the retention force and the lifespan of the installed edge clamp 10. The adhesive 26, for example, a pressure sensitive acrylic foam tape, or the like, may be provided on the clamping surface 58 and the jaw surface 86 to increase the retention of the edge clamp 10 on the support structure 22. Because the adhesive 26 is located on both the ratcheting jaw 78 and the stationary jaw 32, the resulting retention characteristic of the edge clamp 10 is not significantly dependent upon the applied clamping force. Alternatively, adhesive 26 may be applied to just one of the jaw surfaces in select applications.

Figure 15:
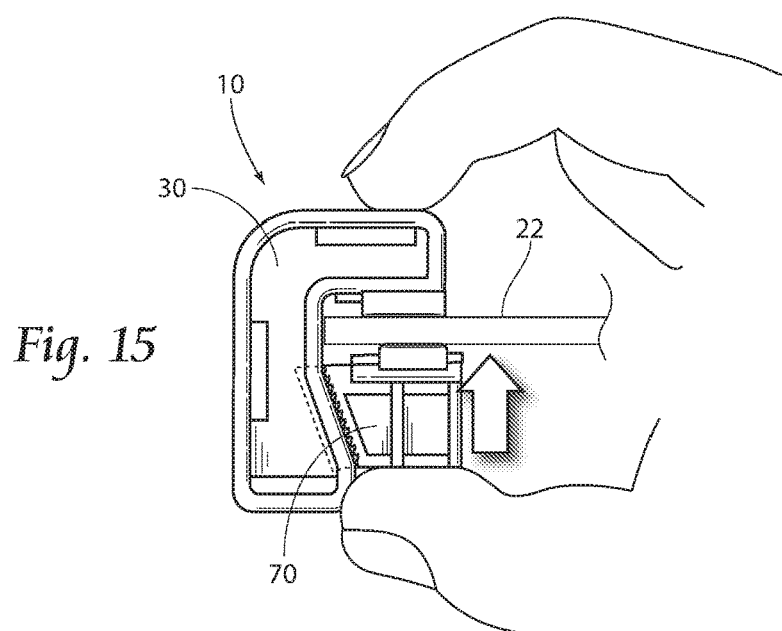
FIG. 15 is a side elevation view showing a manual installation of the wide range edge clamp in accordance with an embodiment of the invention.

As best shown in FIG. 15, the ratcheting member 70 can also be driven up into the clamp body 30 by hand (using fingers, pliers or another suitable hand tool) if the application does not require a specific install force. Again the geometry of the clamp body teeth 50 and ratcheting member teeth 76 adjacent the T-slot 44 and T-rail 72 permit the stationary jaw 32 and the ratcheting jaw 78 to move toward one another, but not in the opposite direction (e.g. away from one another). Once "squeezed" together or installed on a desired support structure 22, the edge clamp 10 can support one or more hoses, wires, cables, conduits or tube bundles.

Figure 16:
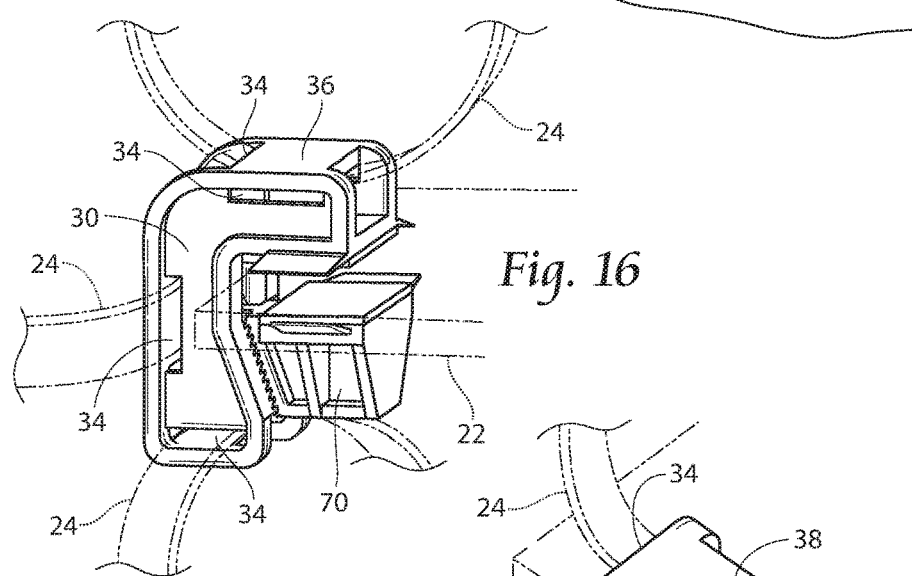
FIG. 16 is a perspective view of the wide range edge clamp showing 3 axes of cable tie installation in accordance with an embodiment of the invention.
Figure 17:
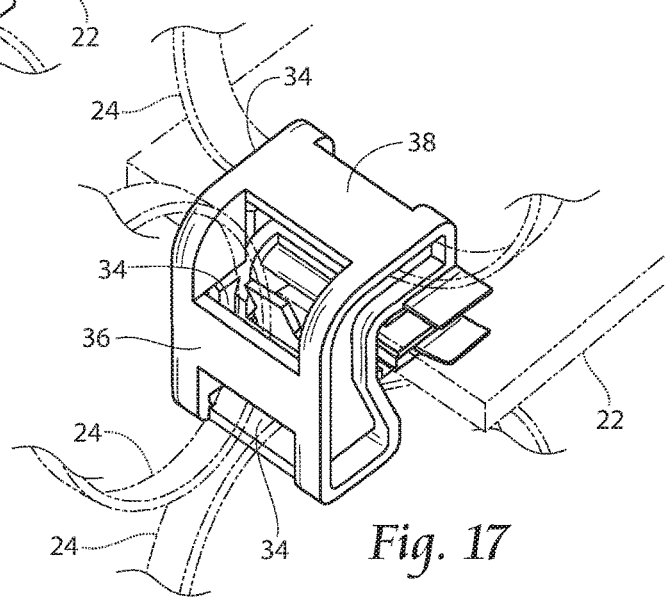
FIG. 17 is another perspective view of the wide range edge clamp showing three additional axes of cable tie installation in accordance with an embodiment of the invention.

In one embodiment and as best shown in FIGS. 16 and 17, the clamp body 30 includes six openings 34 (e.g. oriented along six mutually orthogonal axes) and three saddle surfaces 36. Each of the openings 34 is sized to receive a cable tie 24. The orientation of the openings 34 is such that the cable tie 24 passing there through will support the elongate element in one of two orthogonal directions upon the respective saddle surface 36 located adjacent the openings 34.

Figure 18:
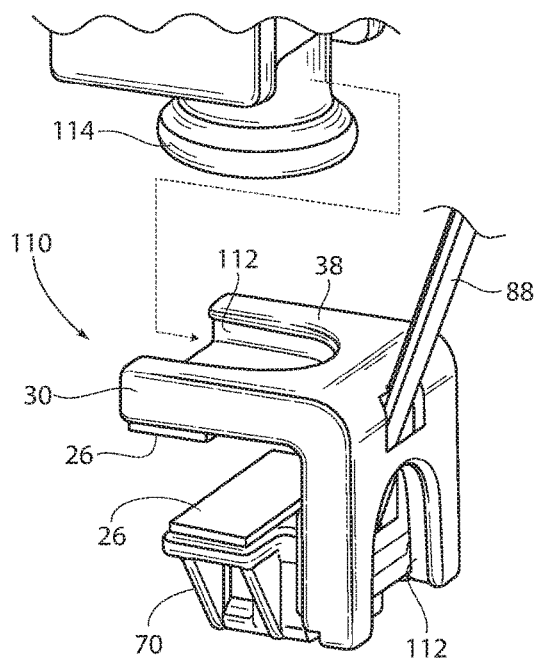
FIG. 18 is a perspective view of the wide range edge clamp showing two "U" slots formed on the clamp body exterior in accordance with an embodiment of the invention.
Figure 19A:
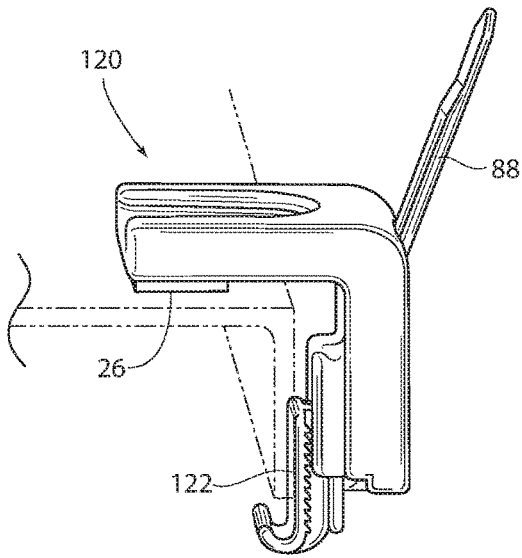
FIG. 19A is a perspective view of the wide range edge clamp showing an alternate ratcheting member for securing the clamp to a channel iron in accordance with an embodiment of the invention.
Figure 19B:
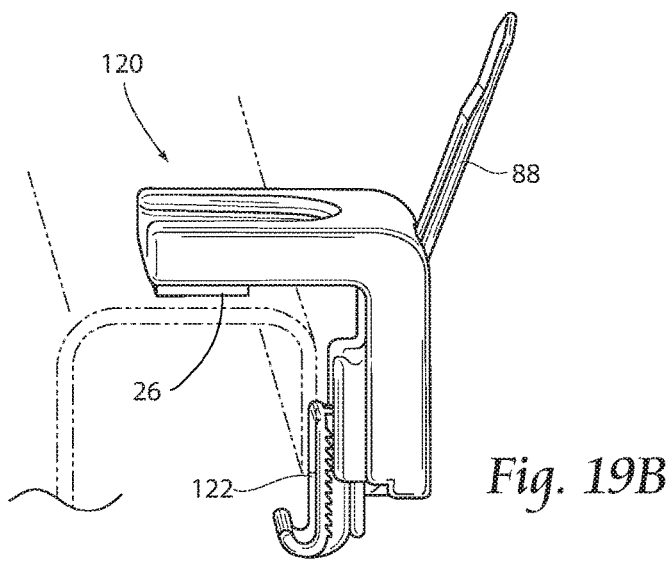
FIG. 19B is a perspective view of the wide range edge clamp showing an alternate ratcheting member for securing the clamp to a sheet metal channel in accordance with an embodiment of the invention.

In an alternate embodiment 110 shown in FIG. 18, U-slots 112 may be provided on the exterior surfaces 38 of the clamp body 30 to allow the attachment of one or more circular "T" connectors 114. In yet another alternate embodiment 120 shown in FIG. 19A, the ratcheting member 70 may be replaced with a smaller "J" hook ratcheting member 122 thus allowing the assembly to grip and ultimately attach to the outer surface and edge of an angle iron instead of a flat support surface, plate or rib. In FIG. 19B, the alternate embodiment 120 is shown being attached to a sheet metal channel. These and other variations of the invention will be apparent without departing from the inventive concepts of the design.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

I claim:

1. A mounting clamp assembly configured to support one or more elongate elements, comprising:
   a clamp body having a stationary jaw defining a first clamping surface and an elongated T-shaped slot, said clamp body defining a plurality of clamp body teeth; and
   a ratcheting member defines an elongated T-shaped protrusion slideably attached to the clamp body, said ratcheting member having a moveable jaw defining a second clamping surface opposite the first clamping surface and further defining a plurality of ratcheting member teeth having a saw tooth profile configured to engage the plurality of clamp body teeth, wherein the T-shaped protrusion is slideably received within the T-shaped slot.

2. The mounting clamp assembly according to claim 1, wherein the first clamping surface is substantially parallel to the second clamping surface and wherein the plurality of clamp body teeth and the plurality of ratcheting member teeth are arranged along a plane that is substantially non-parallel with the first clamping surface and the second clamping surface.

3. The mounting clamp assembly according to claim 1, wherein a first portion of the plurality of clamp body teeth are arranged on first side of a narrow portion of the T-shaped slot and a second portion of the plurality of clamp body teeth are arranged on a second side of the narrow portion of the T-shaped slot and wherein a first portion of the plurality of ratcheting member teeth are arranged on first side of a narrow portion of the T-shaped protrusion and a second portion of the plurality of ratcheting member teeth are arranged on a second side of the narrow portion of the T-shaped protrusion.

4. The mounting clamp assembly according to claim 1, wherein the T-shaped protrusion defines an elongate tension tab extending through an aperture in the clamp body such that a portion of the tension tab extends past an outer surface of the clamp body.

5. The mounting clamp assembly according to claim 4, wherein the tension tab is configured to be grasped by a cable-tie installation tool.

6. The mounting clamp assembly according to claim 1, wherein an adhesive material is applied to the first clamping surface and the second clamping surface.

7. The mounting clamp assembly according to claim 1, wherein the clamp body defines a U-slot in an outer surface of the clamp body configured to receive a circular T-shaped connector.

8. The mounting clamp assembly according to claim 1, wherein the ratcheting member defines a J-shaped hook.

9. A mounting clamp assembly configured to support one or more elongate elements, comprising:
   a clamp body having a stationary jaw defining a first clamping surface, said clamp body defining a plurality of clamp body teeth; and
   a ratcheting member slideably attached to the clamp body, said ratcheting member having a moveable jaw defining a second clamping surface opposite the first clamping surface and further defining a plurality of ratcheting member teeth configured to engage the plurality of clamp body teeth and having a saw tooth profile, wherein the clamp body defines a first channel and a second channel extending therethrough, wherein the first channel is coplanar with the second channel and wherein a major axis of the first channel is perpendicular to a major axis of the second channel.

10. The mounting clamp assembly according to claim 9, wherein the major axes of the first and second channels are substantially parallel to the first clamping surface.

11. The mounting clamp assembly according to claim 10, wherein the clamp body defines a third channel extending therethrough and wherein a major axis of the third channel is perpendicular to the major axes of the first and second channels.

12. The mounting clamp assembly according to claim 11, wherein the major axis of the third channel is substantially perpendicular to the first clamping surface.

13. The mounting clamp assembly according to claim 12, wherein the clamp body defines a fourth channel extending therethrough, wherein the fourth channel is non-coplanar with the first and second channels and wherein a major axis of the fourth channel is parallel to the major axis of the second channel.

14. The mounting clamp assembly according to claim 13, wherein the major axis of the fourth channel is substantially parallel to the first clamping surface.

15. The mounting clamp assembly according to claim 9, wherein the first clamping surface is substantially parallel to the second clamping surface and wherein the plurality of clamp body teeth and the plurality of ratcheting member teeth are arranged along a plane that is substantially non-parallel with the first clamping surface and the second clamping surface.

16. The mounting clamp assembly according to claim 9, wherein an adhesive material is applied to the first clamping surface and the second clamping surface.

17. The mounting clamp assembly according to claim 9, wherein the clamp body defines a U-slot in an outer surface of the clamp body configured to receive a circular T-shaped connector.

18. The mounting clamp assembly according to claim 9, wherein the ratcheting member defines a J-shaped hook.

* * * * *